United States Patent
Roux (10) Patent No.: US 9,904,658 B2
(45) Date of Patent: Feb. 27, 2018

(54) METHOD AND DEVICE FOR AUTOMATICALLY MONITORING A SELF-CONTAINED APPROACH OF AN AIRCRAFT

(71) Applicant: AIRBUS OPERATIONS (SAS), Toulouse (FR)

(72) Inventor: Yohann Roux, Cugnaux (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/181,224

(22) Filed: Jun. 13, 2016

(65) Prior Publication Data

US 2016/0362192 A1 Dec. 15, 2016

(30) Foreign Application Priority Data

Jun. 11, 2015 (FR) .................................... 15 55309

(51) Int. Cl.
| | | |
|---|---|---|
| *G06F 17/11* | (2006.01) | |
| *G05D 1/00* | (2006.01) | |
| *G08G 5/00* | (2006.01) | |
| *G05D 1/06* | (2006.01) | |
| *G08G 5/02* | (2006.01) | |

(52) U.S. Cl.
CPC ........... *G06F 17/11* (2013.01); *G05D 1/0055* (2013.01); *G05D 1/0676* (2013.01); *G08G 5/0021* (2013.01); *G08G 5/025* (2013.01)

(58) Field of Classification Search
CPC .... G06F 17/11; G05D 1/0055; G05D 1/0676; G08G 5/0021; G08G 5/025

USPC ............................................................. 701/9
See application file for complete search history.

(56) References Cited

U.S. PATENT DOCUMENTS

| | | |
|---|---|---|
| 2004/0220733 A1 | 11/2004 | Pasturel et al. |
| 2008/0150785 A1 | 6/2008 | Markiton et al. |
| 2008/0319591 A1 | 12/2008 | Markiton et al. |
| 2012/0041676 A1* | 2/2012 | Bouniol ............... G05D 1/0055 701/472 |
| 2014/0074324 A1* | 3/2014 | Burgin ..................... G08G 5/02 701/9 |

(Continued)

FOREIGN PATENT DOCUMENTS

| | | |
|---|---|---|
| EP | 2 511 733 | 10/2012 |
| FR | 2 944 888 | 10/2010 |

OTHER PUBLICATIONS

French Search Report cited in FR 1555309, two pages, completed Apr. 12, 2016.

*Primary Examiner* — Yazan A Soofi
(74) *Attorney, Agent, or Firm* — Nixon & Vanderhye P.C.

(57) ABSTRACT

A method and device for automatically monitoring a self-contained approach of an aircraft. The device (1) includes a computation unit (8) for calculating, in real time, a first limit depending on a decision height entered by a pilot and a second limit depending on the current height of the aircraft and for selecting, as an alert limit, the maximum value between the first limit and the second limit, a computation unit (9) for calculating, in real time, a protection limit depending on performance of the aircraft, a comparison unit (10) for comparing the protection limit with the alert limit, and an alert unit (13) for emitting an alert signal if the protection limit is greater than the alert limit.

13 Claims, 3 Drawing Sheets

(56) References Cited

U.S. PATENT DOCUMENTS

2015/0364044 A1* 12/2015 Kashi ................... G08G 5/0095
  701/120
2017/0124886 A1* 5/2017 Ishihara ................. G01S 1/022

* cited by examiner

METHOD AND DEVICE FOR AUTOMATICALLY MONITORING A SELF-CONTAINED APPROACH OF AN AIRCRAFT

RELATED APPLICATION

This application claims priority to French Application No. 1555309 filed Jun. 11, 2015, the entire content of each of which application is incorporated by reference.

BACKGROUND OF THE INVENTION

The present invention relates to a method and a device for automatically monitoring a self-contained approach of an aircraft.

DESCRIPTION OF THE PRIOR ART

The present invention applies more particularly, although not exclusively, to a self-contained approach implemented by a transport aircraft and in particular by a military transport aircraft. An approach consists of flying the aircraft in descent in the direction of a runway of an airport, for the purpose of landing on this runway.

An approach is called self-contained if it is based solely on the capabilities of the aircraft to implement the approach without using means external to the aircraft. In particular, no means of navigation, or of ground guidance are used for the approach. This type of approach allows minima of the CAT1 type to be reached (decision height of 200 feet).

In a conventional manner, before flying an aircraft along a self-contained approach, the pilot of the aircraft must enter a decision height, generally into a Flight Management System (FMS). This decision height can be situated between 200 feet and 1000 feet and depends on a minimum published on an approach plate, as well as the navigational performance of the aircraft, which depends on the location and on the date/time of the approach.

The decision height corresponds to the minimum height in relation to the ground at which the pilot must make the decision concerning the approach, namely to continue the approach under visual flight rules in order to make the landing or to initiate a go-around. In particular, the pilot must see the runway at this decision height in order to continue with the landing.

In order to ensure safety during the approach, in particular in instrument flight conditions of the Instrument Meteorological Conditions (IMC) type, a guidance computer of the Flight Control and Guidance System (FOGS) type monitors whether the current navigational performance of the aircraft is compatible with a threshold associated with the decision height entered by the pilot.

To do this, the guidance computer compares, in real time, throughout the approach (between 1000 feet and the decision height), a consolidated Horizontal Protection Limit (or Level) (HPL) and a consolidated Vertical Protection Limit (or Level) (VPL), with, respectively a Horizontal Alert Limit $HAL_{DH}$ and a Vertical Alert Limit $VAL_{DH}$ associated with the decision height DH.

More precisely:
the horizontal protection limit HPL corresponds to the value that allows a horizontal position error limit to be defined with a given probability;
the vertical protection limit VPL corresponds to the value that allows a vertical position error limit to be defined with a given probability;
the horizontal alert limit HAL represents the maximum value tolerated in the horizontal plane beyond which an alert is emitted;
the vertical alert limit VAL represents the maximum value tolerated in the vertical plane beyond which an alert is emitted.

The consolidated protection limits HPL and VPL are estimates of the navigational errors provided by each (generally three) of the GADIRU type air data and inertial units (GPS Air Data Inertial Unit) of the aircraft and consolidated by the guidance computer.

If, during the approach, the value of the protection limit HPL or VPL exceeds, respectively, the value of the alert limit HAL or VAL, the guidance computer invalidates the guidance data and the pilot must abort the self-contained approach by initiating a go-around.

This conventional solution (in which the values of the alert limit HAL and VAL are fixed during the approach and depend exclusively on the entered decision height value) is, however, not optimum in terms of operational performance. In fact, an operational case of a self-contained approach is considered as an example, which presents:
a minimum decision height of 250 feet indicated by the approach plate;
an estimate of performance given on board by the GADIRU air data and inertial units, a little before starting the approach, of 300 feet;
a ceiling (lower cloud limit) of 500 feet; and
a decision height entered by the pilot of 300 feet.

In this example, the self-contained approach starts and performance monitoring is activated in the guidance computer from 1000 feet. The guidance computer compares the protection limits HPL and VPL respectively with alert limits $HAL_{300}$, and $VAL_{300}$, 300 feet being the decision height entered by the pilot. It is assumed that a slight deterioration of performance occurs at 800 feet, causing a protection limit HPL or VPL such that the minimum achievable decision height is 310 feet (and no longer 300 feet). This results in a protection limit HPL or VPL greater than the alert limit $HAL_{300}$ or $VAL_{300}$, and causes an alert to be generated. In this case, the pilot, not having visibility of the runway at 800 feet (the ceiling being at 500 feet), must abort the approach, whereas in terms of navigational performance, the aircraft could have descended to 310 feet in complete safety. With this conventional solution, performance monitoring during the self-contained approach is therefore constrained by the value of the decision height entered by the pilot. This conventional solution, albeit simple, is not optimum in respect of operational performance.

SUMMARY OF THE INVENTION

The object of the present invention is to remedy this disadvantage. It relates to a method for automatically monitoring a self-contained approach of an aircraft, the monitoring method including a step of entering a decision height and a monitoring step, the monitoring step being implemented in an automatic manner and including:
a first computation step consisting of calculating at least one alert limit at least from a first limit depending on the decision height;
a second computation step consisting of calculating, in real time, at least one protection limit depending on performance of the aircraft;
a comparison step consisting of comparing, in real time, the protection limit with the alert limit; and an alert step consisting of emitting an alert signal if the protection limit is greater than the alert limit.

According to the invention:

the monitoring method further includes a step for generating data consisting of automatically determining, in real time, a current height of the aircraft; and the first computation step consists of calculating, in real time, a second limit depending on the current height of the aircraft and of selecting, as an alert limit, the maximum value between the first limit and the second limit, the alert limit thus determined being used by the comparison step.

Thus, thanks to the invention, the current performance (defined in a conventional manner by the protection limit or limits HPL and VPL) of the aircraft is monitored in relation to one or more alert limits (or thresholds) (HAL, VAL) no longer defined only in relation to the decision height entered by the pilot as in the conventional solution, but also in relation to the current height of the aircraft. Guidance is therefore preserved until the aircraft reaches the lowest possible decision height relative to performance, which makes it possible to avoid aborted approaches unjustified in terms of operational performance and to remedy the aforementioned disadvantage.

In a preferred embodiment, the monitoring step is implemented both for two alert limits and two protection limits namely:

a horizontal protection limit associated with a horizontal alert limit; and a vertical protection limit associated with a vertical alert limit.

Furthermore, in an advantageous manner, the first computation step consists of calculating the second limit by means of a mathematical expression identical to that used to calculate the first limit, using the current height in place of the decision height.

Furthermore, advantageously:

for a horizontal protection limit, the first computation step consists of calculating the second limit $HAL_{hAC}$ from the current height hAC of the aircraft, by means of the mathematical expression below, expressed in meters:

$$HAL_{hAC}=0.075*hAC+25;$$

and for a vertical protection limit, the first computation step consists of calculating the second limit $VAL_{hAC}$ from the current height hAC of the aircraft, by means of the mathematical expression below, expressed in meters:

$$VAL_{hAC}=0.08375*hAC+16.25.$$

The current height hAC of the aircraft can be determined in different ways within the framework of the present invention, depending on the altitude reference selected by the pilot on board.

In a first embodiment, in which the altitude reference selected by the pilot is a reference in relation to the runway, the step for generating data consists of using, as a current height of the aircraft, a current altitude of the aircraft, defined in relation to the altitude of a runway towards which the self-contained approach is made and provided by at least one air data and inertial unit.

Furthermore, in a second embodiment, in which the altitude reference selected by the pilot is not a reference in relation to the runway (for example, a reference in relation to sea level), the step for generating data consists of calculating the current height hAC of the aircraft by means of the expression below, expressed in feet:

$$hAC=ZAC-(Za-50)$$

wherein:

ZAC is a current altitude of the aircraft, not defined in relation to the altitude of a runway and provided by at least one air data and inertial unit; and Za is an altitude of an aiming point of the self-contained approach.

This invention also relates to a method for managing a self-contained approach of an aircraft, said method including a step for calculating control orders (guidance orders), the control orders being transmitted to at least one system for assisting with flying the aircraft, said method also including a method for automatically monitoring the self-contained approach. According to the invention, the method for automatically monitoring the self-contained approach is such as that described above.

This invention further relates to a device for automatically monitoring a self-contained approach of an aircraft, the device comprising a unit for entering a decision height and a unit for automatic monitoring, the unit for automatic monitoring including:

a first computation unit configured for calculating at least one alert limit at least from a first limit depending on the decision height;

a second computation unit configured for calculating, in real time, at least one protection limit depending on performance of the aircraft;

a comparison unit configured for comparing the protection limit with the alert limit; and an alert unit configured for emitting an alert signal if the protection limit is greater than the alert limit.

According to the invention:

the (automatic) monitoring device additionally includes a unit for generating data configured for automatically determining, in real time, a current height of the aircraft; and the first computation unit is configured for calculating, in real time, a second limit depending on the current height of the aircraft and for selecting, as an alert limit, the maximum value between the first limit and the second limit, the alert limit thus determined being used by the comparison unit.

The invention further relates to a system for managing a self-contained approach of an aircraft, said management system including a computation unit configured for calculating control orders, the control orders being transmitted to at least one system for assisting with flying the aircraft, said management system also including a device for automatically monitoring the self-contained approach such as that described above.

BRIEF DESCRIPTION OF THE DRAWINGS

The attached figures will bring good understanding of how the invention can be embodied. On these figures, identical references designate similar elements.

DESCRIPTION OF THE PREFERRED EMBODIMENTS

Figure 1:
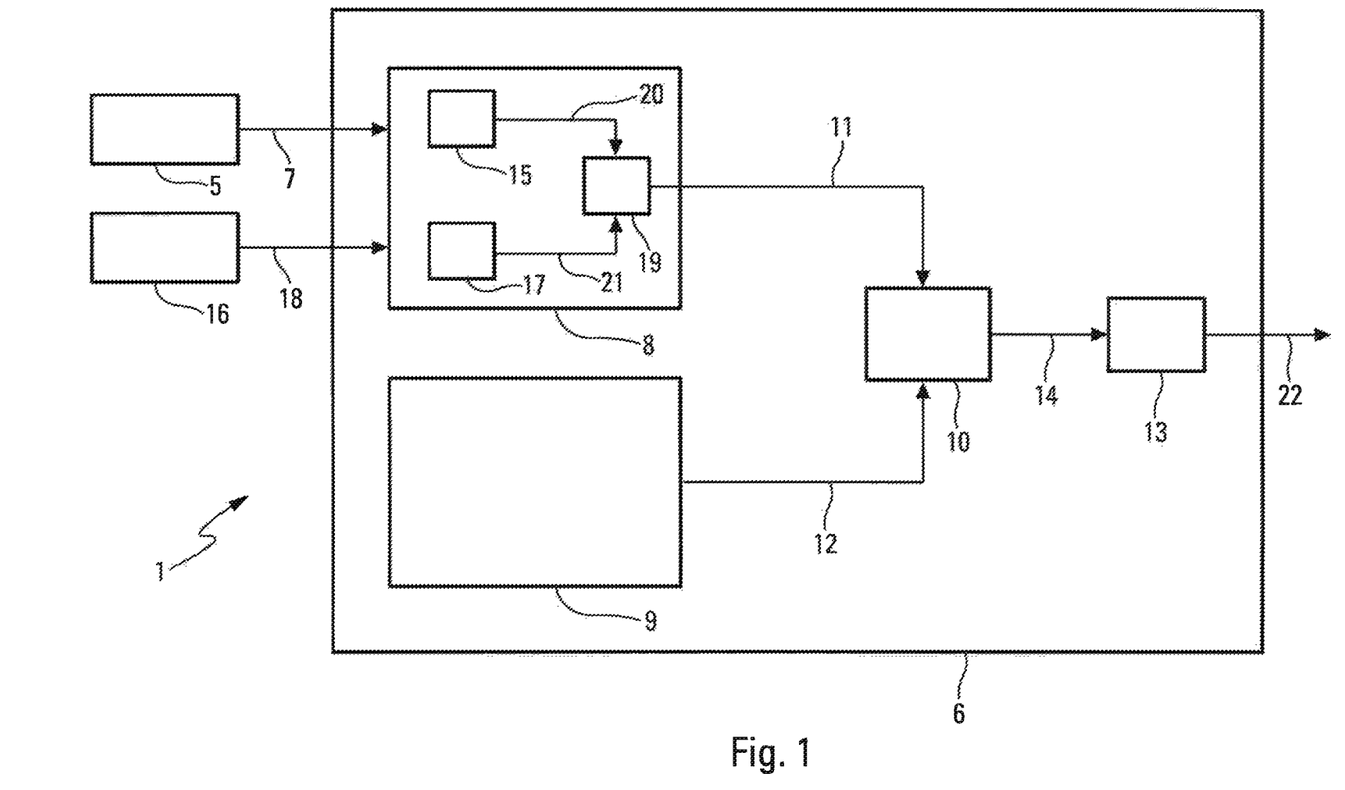
FIG. 1 is the block diagram of a device for automatically monitoring a self-contained approach, which illustrates an embodiment of the invention.

The device 1, diagrammatically shown on FIG. 1 and making it possible to illustrate the invention, is a device for automatically monitoring a self-contained approach of an aircraft AC (FIG. 3), in particular of a transport aircraft, and particularly a military transport aircraft.

This device 1 is part, preferably, of a management system 2 designed to manage a self-contained approach of the aircraft. The management system 2 comprises, as shown on FIG. 2, a computation system 3 for determining in particular control orders, and at least one system 4 for assisting with flying the aircraft as described below.

The device 1, which is on board the aircraft, comprises in particular, as shown on FIG. 1:
- an input unit 5, which is configured to allow a pilot of the aircraft to enter a decision height into said device 1. This input unit 5 can comprise any conventional means (touch screen, trackball, keyboard etc.) making it possible to enter data; and
- an automatic monitoring unit 6, which receives the entered decision height via a link 7.

The automatic monitoring unit 6 includes:
- a computation unit 8 configured for calculating at least one alert limit at least from a first limit depending on the decision height received via the link 7;
- a computation unit 9 configured for calculating, in real time, at least one protection limit depending on performance of the aircraft;
- a comparison unit 10 configured for comparing the alert limit with the protection limit, received respectively from the computation units 8 and 9 via the links 11 and 12; and
- an alert unit 13 configured for emitting an alert signal (via a link 22) if the comparison unit 10 indicates to it via a link 14 that the protection limit is greater than the alert limit.

In a preferred embodiment, the device 1 implements monitoring for two associated alert limits HAL and VAL and two protection limits HPL and VPL, namely:
- a horizontal protection limit HPL associated with a horizontal alert limit HAL; and
- a vertical protection limit VPL associated with a vertical alert limit VAL.

The computation unit 8 furthermore includes a computation element 15, which calculates the first limit ($HAL_{DH}$ or $VAL_{DH}$) by means of the mathematical expressions below, which use the decision height DH (received via the link 7):

$$HAL_{DH}=0.075*DH+25$$

$$VAL_{DH}=0.08375*DH+16.25.$$

The computation unit 9 furthermore calculates the protection limits HPL and VPL in a conventional manner. More precisely, preferably:
- the horizontal protection limit HPL corresponds to the radius of a circle in the horizontal plane, whose center is situated at the true position. This circle represents a region guaranteed to contain the indicated horizontal position with a required integrity risk. The computation of this horizontal protection limit uses a measurement from the measurement quality of a GPS system used by the aircraft; and
- the vertical protection limit VPL corresponds to half the length of a segment along a vertical axis (perpendicular to the horizontal plane), whose center is situated at the true position. This segment represents a region guaranteed to contain the indicated vertical position with a required integrity risk. The computation of this vertical protection limit also uses a measurement from the measurement quality of a GPS system used by the aircraft.

According to the invention:
- the device 1 additionally includes a unit 16 for generating data, which is configured to determine automatically, in real time, a current height of the aircraft as described below; and
- the computation unit 8 is configured to calculate, in real time, a second limit depending on the current height of the aircraft and to select, in real time, as an alert limit, the maximum value between the first limit and this second limit.

The alert limit thus determined by the computation unit 8 is transmitted via the link 11 to the comparison unit 10 and is used by this comparison unit 10 in order to perform the planned comparisons.

To do this, the computation unit 8 comprises, in addition to the computation element 15:
- a computation element 17 for calculating the second limit depending on the current height, the limit being received via a link 18 of the unit 16 for generating data; and
- a computation element 19, which:
    - compares the first limit $HAL_{DH}$ or $VAL_{DH}$, received via a link 20 of the computation element 15, with the second limit $HAL_{hAC}$ or $VAL_{hAC}$, received via a link 21 of the computation element 17;
    - selects as an alert limit HAL or VAL, the maximum value between these first and second limits ($HAL_{DH}$ and $HAL_{hAC}$; $VAL_{DH}$ and $VAL_{hAC}$); and
    - transmits this alert limit HAL or VAL to the comparison unit 10 via the link 11.

The device 1 thus monitors the current performance (defined by the protection limit or limits HPL and VPL) of the aircraft in relation to one or more alert limits (or thresholds) (HAL, VAL) no longer defined only in relation to the decision height DH entered by the pilot as in the conventional solution, but also in relation to the current height hAC of the aircraft. This allows guidance to be preserved until the aircraft reaches the lowest possible height in terms of navigational performance, thus making it possible to avoid aborted approaches unjustified in relation to performance.

The computation element 17 is configured to calculate the second limit ($HAL_{hAC}$ or $VAL_{hAC}$) by means of a mathematical expression, which is identical to that used by the computation element 15 for calculating the first limit ($HAL_{DH}$ or $VAL_{DH}$), using the current height hAC of the aircraft in relation to the runway threshold in place of the decision height DH.

Thus, for a horizontal protection limit, the computation element 17 calculates the second limit $HAL_{hAC}$ from the current height hAC of the aircraft, by means of the mathematical expression below, expressed in meters:

$$HAL_{hAC}=0.075*hAC+25.$$

Furthermore, for a vertical protection limit, the computation element 17 calculates the second limit $VAL_{hAC}$ from the current height hAC of the aircraft, by means of the mathematical expression below, expressed in meters:

$$VAL_{hAC}=0.08375*hAC+16.025.$$

Within the framework of this invention, the current height hAC of the aircraft AC can be determined in different ways in relation to the threshold 24 of the runway 23 (FIG. 3), this height being used by the computation element 17. In a first particular embodiment, the unit 16 for generating data automatically determines, in real time, the current height of the aircraft in relation to the runway threshold, using, as a current height hAC of the aircraft, a current altitude of the aircraft, which is defined in relation to the altitude of the runway towards which the self-contained approach is made and which is provided by at least one air data and inertial unit.

Thus, if the altitude reference selected by the pilot is as QFE (that is to say, as a reference in relation to the height of the runway), the current height of the aircraft in relation to the threshold 24 of the runway 23 (FIG. 3) is equal to the current altitude provided by the air data and inertial unit or units (described below with reference to FIG. 2).

In a second particular embodiment, the unit 16 for generating data automatically calculates, in real time, the current height of the aircraft in relation to the threshold 24 of the runway 23 (FIG. 3), by means of the expression below, expressed in feet:

$$hAC = ZAC - (Za - 50)$$

wherein:
ZAC is the current altitude of the aircraft, which is not defined in relation to the altitude of the runway (that is to say different from QFE) and which is provided by at least one air data and inertial unit; and
Za is an altitude of the aiming point of the self-contained approach, that is to say, of the point on the runway where the approach trajectory the aircraft must take ends. The altitude Za is known in a conventional manner on board the aircraft through a guidance computer (described below with reference to FIG. 2).

Thus, if the altitude reference selected by the pilot is different from QFE (that is to say as GEO (for geometric), QNH (in relation to sea level) or STD (for standard)), the current height of the aircraft is calculated by means of the aforementioned mathematical expression.

The aiming point is nominally situated 50 feet above the threshold 24 of the runway 23. In certain particular cases, the aiming point is situated above 50 feet. By subtracting a default value of 50 feet, the expression is conservative in the sense that the height of the aircraft is underestimated and therefore the alert threshold (HAL/VAL) is more restrictive.

The functioning of the device 1, as described above, is as follows:
the unit 16 for generating data automatically determines, in real time, the current height of the aircraft;
the computation unit 8 automatically calculates, in real time, at least one alert limit from a first limit depending on the decision height and from a second limit depending on the current height of the aircraft;
the computation unit 9 automatically calculates, in real time, at least one protection limit depending on performance of the aircraft;
the comparison unit 10 compares the protection limit with the alert limit; and
an alert unit 13 automatically emits an alert signal if the protection limit is greater than the alert limit.

The device 1 is therefore part of a management system 2, which comprises, as shown on FIG. 2, a computation system 3 for determining in particular control orders (guidance orders), and at least one system 4 for assisting with flying the aircraft as described below. The control orders determined by the computation system 3 are automatically transmitted to the system 4 for assisting with flying the aircraft via a link 25.

The system 4 for assisting with flying can be:
an automatic pilot system 26 of the conventional type, which automatically receives guidance orders and automatically flies the aircraft according to these guidance orders; and
at least one display system 27, of the head-down or head-up type, which displays in the cockpit flight indications compatible with said guidance orders received in order to allow the pilot to fly the aircraft manually in accordance with these guidance orders.

Figure 2:
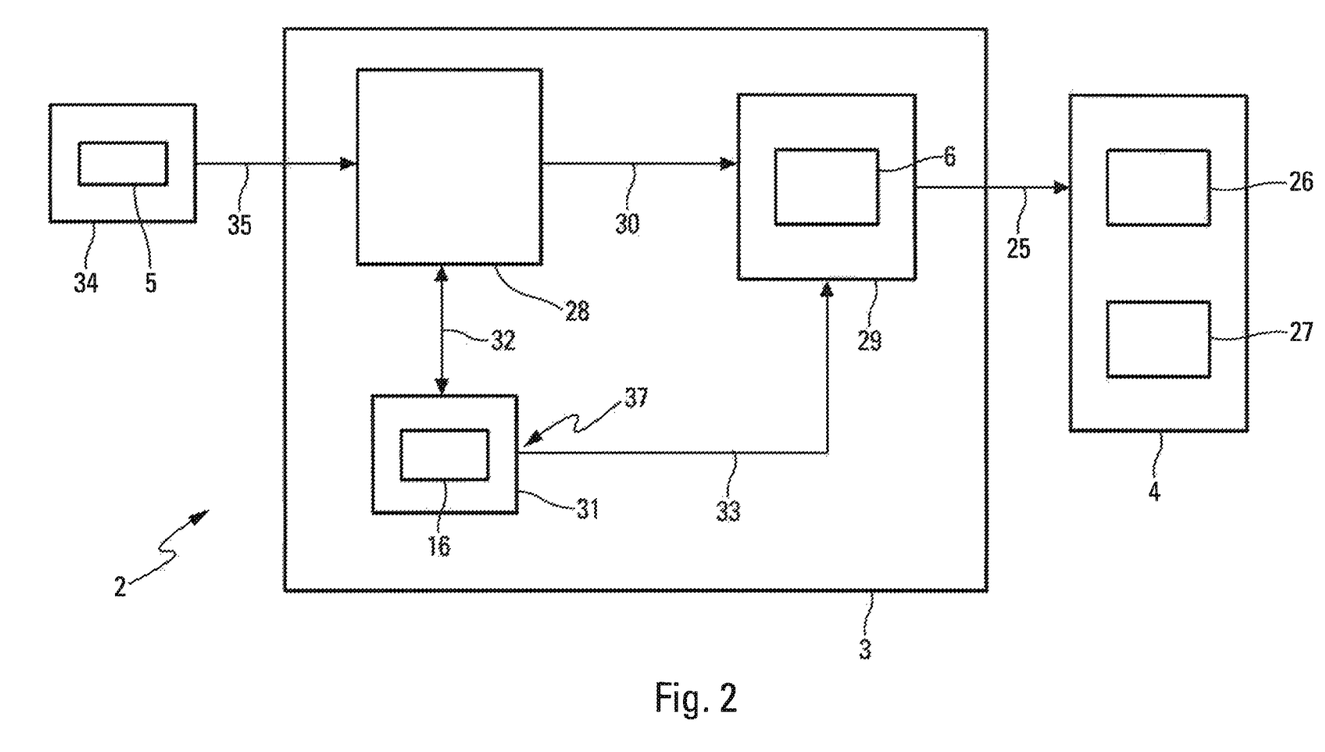
FIG. 2 is the block diagram of a system for managing a self-contained approach.
Figure 3:
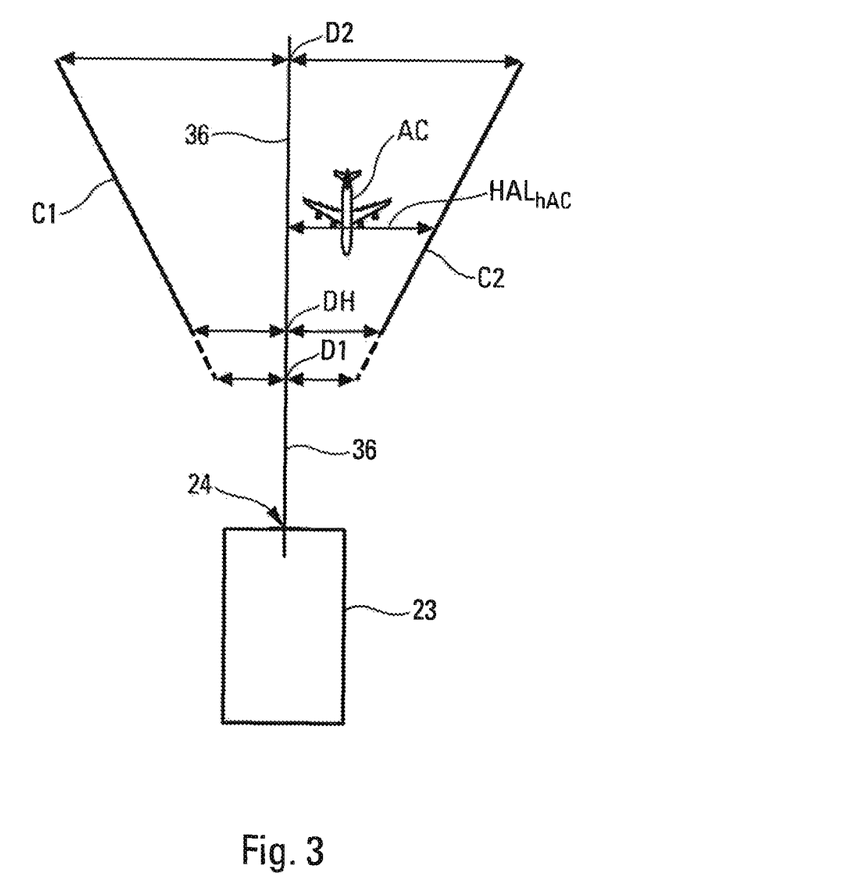
FIG. 3 illustrates the change of alert limits during a self-contained approach for the purpose of landing on a runway.

In the example of FIG. 2, the system 2 for managing the self-contained approach includes the following elements, grouped together in the computation system 3:
a Flight Management System (FMS) 28;
a guidance computer 29 of the Flight Control and Guidance System (FOGS) type, which is linked through a link 30 to the flight management system 28;
a position computer 37 including at least one but preferably a plurality of air data and inertial units 31 of the GPS Air Data Inertial Unit (GADIRU) type, which are linked through links 32 and 33 respectively to the flight management system 28 and to the guidance computer 29.

The management system 2 can also comprise an input system 34 allowing an operator to enter data, in particular into the flight management system 28 (via a link 35). This input system 34 can comprise any conventional means (touch screen, trackball, keyboard etc.) making it possible to enter data.

In the architecture shown on FIG. 2, the elements of the device 1 can be integrated in the elements of the management system 2 as follows:
the input unit 5 is part of the input system 34;
the monitoring unit 6 is integrated, at least in part, in the guidance computer 29; and
the unit 16 for generating data is integrated, at least in part, in the position computer 37.

The implementation of the self-contained approach by means of the management system 2 is as follows. The pilot enters the characteristics of the self-contained approach (runway, slope, decision height etc.) through the flight management system 28 (via the input system 34).

The pilot can also make a request (via the input unit 5, for example) for an estimate of the decision height achievable at the moment of the self-contained approach, through the flight management computer 28, which interrogates the position computer 37 (via the link 32) in order to make this estimate of navigational performance.

During the self-contained approach, the guidance computer 29 calculates, in a conventional manner, the guidance orders and sends the deviations to the system(s) 4 assisting with the approach (display system(s) 27/automatic pilot 26). The guidance is realized by using the characteristics of the self-contained approach, provided by the flight management system 28 (via the link 30) and the position provided by the position computer 37 (via the link 33).

The guidance computer 29 also ensures, via the device 1 (monitoring unit 6), monitoring of the navigational performance during the self-contained approach, by comparing the estimated position error (HPL, VPL) provided by the position computer 37 with the alert threshold (HAL, VAL), taking account of the altitude of the aircraft provided by the position computer 37 and the decision height provided by the flight management system 28. In the event of an emission of an alert signal during the self-contained approach, the guidance computer 29 invalidates the guidance data for the display so that the pilot initiates a go-around.

FIG. 3 furthermore illustrates an example of monitoring (adaptative) in the horizontal plane.

It shows the changes C1 and C2 of the values of the horizontal alert limit $HAL_{hAC}$ between two distances (or heights) D1 (200 feet) and D2 (preferably 1000 feet) in relation to the runway 23 for a decision height DH (300 feet for example).

During the self-contained approach along an axis 36 for a landing on the runway 23, the changes C1 and C2 are symmetrical in the horizontal plane in relation to the axis 36.

The device 1, as described above, thus offers the particular advantage of making it possible to avoid aborted approaches unjustified in terms of performance and to optimize the approach in respect of operational performance. To do this, it monitors current performance (defined by the protection limit or limits HPL and VPL) of the aircraft in relation to one or more alert limits (or thresholds) (HAL, VAL), defined both in relation to the decision height DH entered by the pilot and in relation to the current height hAC of the aircraft. Guidance is therefore preserved until the aircraft reaches the lowest possible height relative to operational performance.

The invention claimed is:

1. A method for automatically monitoring a self-contained approach of an aircraft, the method comprising
    entering a decision height, and
    a monitoring step, the monitoring step being implemented in an automatic manner and including:
    a first computation step including determining alert limit based on a calculation of a first limit depending on the decision height and a calculation of a second limit depending on a current height of the aircraft, wherein the calculations of the first limit and the second limit use the same mathematical expression which differ in the use of the decision height and the current height;
    a second computation step including calculating, in real time, at least one protection limit depending on performance of the aircraft;
    a comparison step including comparing, in real time, the protection limit with the alert limit;
    an alert step including emitting an alert signal if the protection limit is greater than the alert limit; and
    a step for generating data including automatically determining, in real time, the current height of the aircraft, and
    selecting, as the alert limit, a maximum value of the first limit and the second limit.

2. The method as claimed in claim 1, wherein the monitoring step is implemented for two alert limits and two protection limits including:
    a horizontal protection limit associated with a horizontal alert limit; and
    a vertical protection limit associated with a vertical alert limit.

3. The method as claimed in claim 1, wherein, for a horizontal protection limit, the first computation step includes calculating the second limit $HAL_{hAC}$ from the current height hAC of the aircraft, using the mathematical expression below, expressed in meters:

$$HAL_{hAC}=0.075*hAC+25.$$

4. The method as claimed in claim 1, wherein, for a vertical protection limit, the first computation step includes calculating the second limit $VAL_{hAC}$ from the current height hAC of the aircraft, using the mathematical expression below, expressed in meters:

$$VAL_{hac}=0.08375*hAC+16,25.$$

5. The method as claimed in claim 1, wherein the step for generating data includes using, as a current height of the aircraft, a current altitude of the aircraft, defined in relation to the altitude of a runway towards which the self-contained approach is made and provided by at least one air data and inertial unit.

6. The method as claimed in claim 1, wherein the step for generating data includes calculating the current height hAC of the aircraft by means of the expression below, expressed in feet:

$$hAC=ZAC-(Za-50)$$

wherein: ZAC is a current altitude of the aircraft, not defined in relation to the altitude of a runway and provided by at least one air data and inertial unit; and Za is an altitude of an aiming point of the self-contained approach.

7. A method for managing a self-contained approach of an aircraft, said method including calculating control orders, the control orders being transmitted to at least one system for assisting with flying the aircraft,
    and the method for automatically monitoring the self-contained approach is such as that specified under claim 1.

8. A device for automatically monitoring a self-contained approach of an aircraft, the device comprising:
    a unit for entering a decision height and a unit for automatic monitoring, the unit for automatic monitoring including:
    a first computation unit configured to determine an alert limit based on a calculation of a first limit depending on the decision height and a calculation of a second limit depending on a current height of the aircraft, wherein the calculations of the first limit and the second limit use the same mathematical expression which differ in the use of the decision height and the current height;
    a second computation unit configured to calculate, in real time, at least one protection limit depending on performance of the aircraft;
    a comparison unit configured to compare the protection limit with the alert limit;
    an alert unit configured to emit an alert signal if the protection limit is greater than the alert limit;
    a data generating, unit configured to automatically determining, in real time, a current height of the aircraft, and
    selecting, as the alert limit the maximum value of the first limit and the second limit, the alert limit thus determined being used by the comparison unit.

9. A system for managing a self-contained approach of an aircraft, said management system including a computation unit configured to calculate control orders, the control orders being transmitted to at least one system for assisting with flying the aircraft, said management system also including the device for automatically monitoring the self-contained approach recited in claim 8.

10. A method to monitor a self-contained approach of an aircraft comprising:
    receiving a decision height corresponding to a landing approach for the aircraft;
    calculating a first alert limit based on the decision height;

repeatedly determining a height of the aircraft during the landing approach and designating the most recent height as a current height of the aircraft;
repeatedly calculating a protection limit based on the current height of the aircraft and designating the most recent protection limit as a current protection limit;
repeatedly calculating a second alert limit based on the current height of the aircraft and designating the most recent second alert limit as a current second alert limit;
selecting as a maximum alert limit the greater of the first alert limit and the current second alert limit;
repeatedly comparing the current protection limit to the maximum alert limit; and
issuing an alert signal to an aircrew of the aircraft if the protection limit is greater than the maximum alert limit.

11. The method of claim 1 wherein the first alert limit is at least on one of a horizontal first alert limit and a first vertical alert limit; the second alert limit is at least one of a horizontal second alert limit and a second vertical alert limit, and the protection limit is at least one of a horizontal protection limit and a vertical protection limit.

12. The method of claim 1 wherein the steps are performed automatically except that the step of receiving is performed in response to a manual input of the decision height.

13. The method of claim 1 wherein a flight management system on the aircraft automatically performs the steps except that the step of receiving is performed in response to a manual input of the decision height.

* * * * *